United States Patent [19]

Nishimura et al.

[11] Patent Number: 4,826,279
[45] Date of Patent: May 2, 1989

[54] OPTICAL FIBER UNIT

[75] Inventors: Akira Nishimura; Ichiro Ogasawara, both of Kanagawa, Japan

[73] Assignee: Sumitomo Electric Industries, Ltd., Osaka, Japan

[21] Appl. No.: 146,399

[22] Filed: Jan. 21, 1988

[30] Foreign Application Priority Data

Jan. 23, 1987 [JP] Japan .................................. 62-13731

[51] Int. Cl.[4] .............................................. B02B 6/44
[52] U.S. Cl. .................................................. 350/96.23
[58] Field of Search ....................................... 350/96.23

[56] References Cited

U.S. PATENT DOCUMENTS 4,690,498 9/1987 Priaroggia ........................ 350/96.23

FOREIGN PATENT DOCUMENTS 554844 9/1986 Australia .
61-53612 3/1986 Japan ................................. 350/96.23
62-9308 1/1987 Japan ................................. 350/96.23

8606178 10/1986 PCT Int'l Appl. .

Primary Examiner—John D. Lee
Assistant Examiner—John Ngo
Attorney, Agent, or Firm—Cushman, Darby & Cushman

[57] ABSTRACT

An optical fiber unit for forming high-density optical cables in optical communication networks includes a core body having a twisted tensile strength member extended along the central axis thereof, spiral grooves in the outer surface thereof, and tape-shaped optical fibers placed in the spiral grooves of the core body, with the twist direction of the twisted member and the spiral direction of the grooves being opposite one another. Thus, when the core body is under tension, the angular moment produced in the tensile strength member and that produced in the ribs formed between the spiral grooves are opposite in direction and equal in magnitude, whereby the angular moment of the entire core body is substantially zero. As a result, the optical fiber residual strain produced during manufacture can be controlled with high precision.

2 Claims, 1 Drawing Sheet

OPTICAL FIBER UNIT

BACKGROUND OF THE INVENTION

This invention relates to optical fiber units forming high-density optical cables in optical communication networks, and more particularly to the structure of an optical fiber unit comprising a core body having a twisted tensile strength member extended along the central axis thereof and spiral grooves in the outer surface thereof; and tape-shaped optical fibers placed in the spiral grooves of the core body, in which the optical fiber residual strain produced during manufacture can be controlled with high precision.

A variety of research has been conducted on the construction of an optical fiber unit of this type. However, the structure of an optical fiber unit suitable for precisely controlling the residual strain which is produced in optical fibers during the manufacture of the optical fiber unit has not been developed yet.

In the manufacture of the above-described optical fiber unit, during insertion of a plurality of tape-shaped optical fiber assemblies, which comprise multiple optical fibers in the form of a tape (hereinafter referred to as "tape-shaped optical fibers", when applicable), into spiral grooves formed in the outer surface of the core body, in general a predetermined tensile force is applied to the core body to hold the latter straight or to stably feed the core body to the insertion point. When the core body is tensioned in this manner, angular moments around the central axis of the core body are produced in the twisted tensile strength member, and in ribs formed between the spiral grooves of the core body in such a manner that the pitches thereof are increased. However, in the conventional optical fiber unit, no counter measure is taken against these angular moments. Therefore, the conventional optical fiber unit is subjected to twisting of the core body by the aforementioned tensile force, resulting in a change in the pitch of the spiral grooves.

That is, when the pitch p of the spiral grooves is changed to a value p' by the twist of the core body, the spiral line length changes according to the following equation (1):

$$\epsilon_p = \sqrt{1 + \left(\frac{2\pi a}{p'}\right)^2} \bigg/ \sqrt{1 + \left(\frac{2\pi a}{p}\right)^2} \quad (1)$$

In general, when the tape-shaped optical fibers are inserted into the spiral grooves of the core body, a supply tensile force $T_s$ for feeding the core body and the supply tensile force $T_t$ for supplying the tape-shaped optical fibers into the spiral grooves are determined according to the following expression (2) so that, when the optical fiber unit is released from the tensile force, the tape-shaped optical fibers are sufficiently small in residual elongation strain:

$$0 < \frac{T_t}{E_t S_t} - \frac{T_s}{E_s S_s} < 10^{-4} \quad (2)$$

where $E_s$ and $S_s$ are the equivalent elastic modulus and the sectional area of the core body, respectively, and $E_t$ and $S_t$ are the equivalent elastic modulus and the sectional area of each tape-shaped optical fiber, respectively. However, if the core body is twisted when the tape-shaped optical fibers are inserted into the spiral grooves of the core body, the actual residual strain $\epsilon$ of the tape-shaped optical fibers is as follows:

$$\epsilon = \frac{T_t}{E_t S_t} - \frac{T_s}{E_s S_s} \cdot \epsilon_p (3)$$

That is, it becomes difficult to precisely control the residual strain.

SUMMARY OF THE INVENTION

The above-described difficulties accompanying a conventional optical fiber unit have been eliminated by the provision of an optical fiber unit comprising: a core body having a twisted tensile strength member extended along the central axis thereof and spiral grooves formed in the outer surface thereof; and tape-shaped optical fibers inserted in the spiral grooves, in which, according to the invention, the twist direction of the tensile strength member is opposite to the spiral winding direction of the spiral grooves. The twist pitch $p_c$ of the tensile strength member and the spiral pitch $p_R$ of the ribs formed between the spiral grooves satisfy the following expressions:

$$\frac{p_R}{p_c} = \frac{a_R}{a_c} \cdot \frac{\tan\theta}{\tan\Phi},$$

$$\frac{\sin\theta}{\sin\Phi} = \frac{n_R^2 a_R E_R S_R}{n_c^2 a_c E_c S_c}$$

where $E_c$ is the Young's modulus of the tensile member in a longitudinal direction, $S_c$ is the sectional area of each element forming the tensile strength member, $a_c$ and $p_c$ are the twist radius and the twist pitch of the tensile strength member, respectively, $n_c$ is the number of elements forming the tensile strength member, $E_R$ is the Young's modulus of each rib, $a_R$ is the distance between the central axis of the core body and the center of each rib, and $P_R$ and $n_R$ are the spiral pitch of the ribs and the number of ribs, respectively.

DETAILED DESCRIPTION OF THE INVENTION

Figure 1:
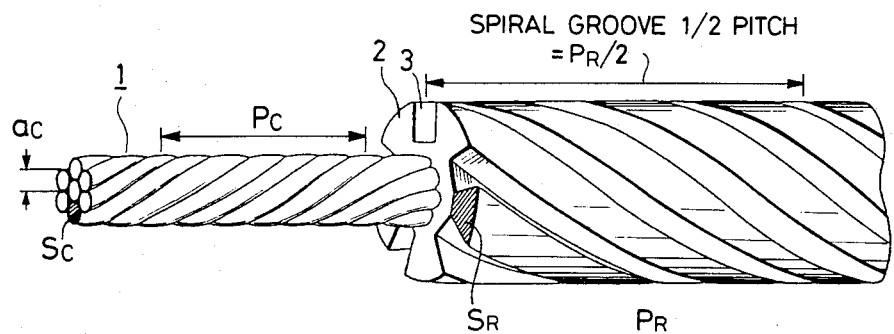
FIG. 1 is a perspective view showing the structure of a core body in an optical fiber unit according to the invention.
Figure 2:
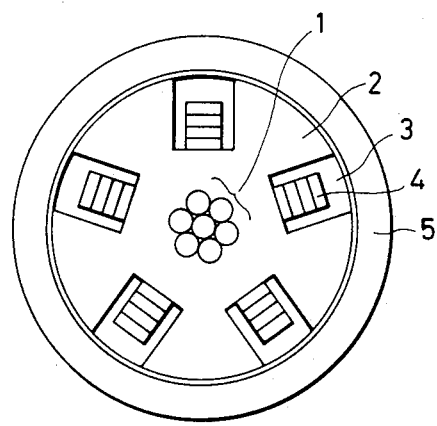
FIG. 2 is a sectional view showing the construction of an optical cable with the optical fiber unit according to the invention.
Figure 3:
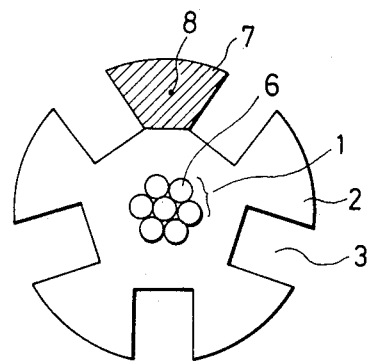
FIG. 3 is an explanatory diagram showing the parts of the core body in the optical fiber unit according to the invention.

The structure of the optical fiber unit according to the invention is such that, when the core body is tensed, the angular moment produced in the tensile strength member and that produced in the ribs formed between the spiral grooves are opposite in direction to each other and equal in magnitude to each other. Thus the angular moments cancel each other and the angular moment of the entire core body is made substantially zero.

Conditions for zeroing the angular moment of the entire core body in the optical fiber unit according to the invention will now be described.

In the accompanying figures, reference numeral 1 designates a tensile strength member; 2 designates a member formed by extrusion molding; 3 designates spiral grooves; 4 designates tape-shaped optical fibers; 5 designates a sheath; 6 designates tensile strength member forming elements; 7 designates ribs; and 8 designates the center of each rib. In the above-described example, the core body comprises the tensile strength member 1 extended along the central axis and the extrusion-molded member 2 which is formed around the tensile strength member 1 by extrusion molding.

A tensile force F applied to the core body can be represented by the following equation (4):

$$F = F_c + F_p \tag{4}$$

where $F_c$ is the tensile force born by the tensile strength member 1, and $F_p$ is the tensile force born by the extrusion-molded member 2.

$F_c$ and $F_p$ can be represented by the following equations (5):

$$F_c = \frac{n_c E_c S_c}{n_c E_c S_c + E_R S_p} F \tag{5}$$

$$F_p = \frac{E_R S_p}{n_c E_c S_c + E_R S_p} F$$

where $E_c$ is the Young's modulus of the tensile strength member in a longitudinal direction, $S_c$ is the sectional area of each of the elements forming the tensile strength member, $E_R$ is the Young's modulus of the extrusion-molded member 2, and $S_p$ is the sectional area of the extrusion-molded member 2.

When the tensile force $F_c$ is applied to the tensile strength member 1, the angular moment provided around the central axis of the tensile strength member; i.e., the central axis of the core body can be expressed by the following equations (6):

$$|M1_c| = n_c a_c F_c \sin\theta \tag{6}$$

$$\tan\theta = \frac{2\pi a_c}{p_c}$$

where $a_c$ is the twist radius of the tensile strength member 1, $p_c$ is the twist pitch of the member 1, and $n_c$ is the number of twisted elements of the member 1.

When the tensile force $F_p$ is applied to the extrusion-molded member 2, an angular moment is provided around the central axis of the core body by the ribs 7. The tensile force born by a single rib 7 is:

$$F_R = \frac{n_R S_R}{S_p} F_p \tag{7}$$

where $S_R$ is the sectional area of each rib. Therefore, the sum of the angular moments produced in $n_R$ ribs is:

$$|M1_R| = n_R^2 a_R \frac{S_R}{S_p} F_p \sin\Phi \tag{8}$$

$$\tan\Phi = \frac{2\pi a_R}{p_R}$$

where $a_R$ is the distance between the central axis of the core body and the center 8 of each rib.

The angular moment of the whole core body can be zeroed when the moments $M|_c$ and $M|_R$ are opposite in direction to each other and equal in magnitude to each other. From equations (5), (6) and (8), the conditions for zeroing the angular moment are as follows:

$$\frac{p_R}{p_c} = \frac{a_R}{a_c} \cdot \frac{\tan\theta}{\tan\Phi} \tag{9}$$

$$\frac{\sin\theta}{\sin\Phi} = \frac{n_R^2 a_R E_R S_R}{n_c^2 a_c E_c S_c}$$

A concrete example of the invention, identified below as a core body No. 1, was prepared and compared with a conventional structure identified below as a core body No. 2. In the core body No. 1, the twist direction of the tensile strength member was opposite to the spiral direction of the spiral grooves. In the core body No. 2, the twist direction of the tensile strength member was the same as the spiral direction of the spiral grooves. The other structural data of the core bodies No. 1 and No. 2 are as indicated in the following Table:

TABLE 1

| | Core Body No. 1 | Core Body No. 2 |
|---|---|---|
| Outside diameter | 10.5 mm φ | 10.5 mm φ |
| Number of grooves | 6 | 6 |
| Material of extrusion-molded member | HDPE | HDPE |
| Extrusion-molded member's Young's modulus | 45 Kg/mm2 | 45 Kg/mm2 |
| Groove dimension | 2 mm wide × 2 mm deep | 2 mm wide × 2 mm deep |
| Groove spiral pitch | 300 mm | 300 mm |
| Groove spiral direction | Clockwise | Counter-clockwise |
| Material of tensile strength member | Stranded steel wires | Stranded steel wires |
| Tensile strength member dimension | 7 pieces/0.7 mm φ | 7 pieces/0.7 mm φ |
| Tensile strength member's Young's modulus | 18000 Kg/mm2 | 18000 Kg/mm2 |
| Tensile strength member twist pitch | 150 mm | 150 mm |
| Tensile strength member twist direction | Counter-clockwise | Counter-clockwise |

Four tape-shaped five-core optical fibers were placed in each of the grooves of the core body No. 1 and a retaining tape was wound around the core body, to form an optical fiber unit. Another optical fiber unit was formed by using the core body No. 2 in the same manner.

The core bodies No. 1 and No. 2 had an equivalent elastic modulus of 830 Kg/mm² and a sectional area of 61.5 mm². The taped-shaped optical fibers had an equivalent elastic modulus of 670 Kg/mm², and a sectional area of 0.65 mm².

When the tape-shaped optical fibers were inserted into the grooves of the extrusion-molded members, the tensile forces applied to the core bodies No. 1 and No. 2 were both 7 Kg, and the tensile forces applied to the tape-shaped optical fibers were 100 g, so that the residual strain of the tape-shaped optical fiber assemblies was on the order of 0.01%.

The tape-shaped optical fibers were removed from the optical fiber units which were made by using the core bodies No. 1 and No. 2 as was described. The residual strain of the tape-shaped optical fibers thus removed was measured by monitoring the lengths thereof by the optical phase method, separately according to the lamination positions thereof. The results of the measurements are as listed in Table 2:

TABLE 2

| Tape Position | Core body No. 1 | Core body No. 2 |
| --- | --- | --- |
| 1 | 0.009% | 0.023% |
| 2 | 0.007% | 0.020% |
| 3 | 0.009% | 0.021% |
| 4 | 0.012% | 0.024% |

In Table 2, the tape position indicates the order of lamination of the tape-shaped optical fibers beginning with the outermost layer. As is apparent from Table 2, the residual strain of the tape-shaped optical fibers of the optical fiber unit using the core body No. 1 according to the invention was on the order of 0.01% whereas that of the tape-shaped optical fibers of the optical fiber unit formed by using the core body No. 2 in which the twist direction of the tensile strength member is the same as the spiral direction of the spiral grooves was in a range of from 0.02% to 0.03%. As was described above, the core body comprising the tensile strength member formed by twisting the tensile strength member forming elements, and the extrusion-molded member formed around the tensile strength member and having the spiral grooves in the outer wall, is designed according to the present invention so that the twist direction of the tensile strength member is opposite to the spiral winding direction of the spiral grooves and the twist pitch of the tensile strength member and the pitch of the spiral ribs formed between the spiral grooves are selected so that the angular moment of the core body is zeroed. Therefore, in the manufacture of optical fibers units, the residual strain of the tape-shaped optical fibers can be controlled with a high degree of accuracy.

In the manufacture of the optical fiber unit according to the invention, the residual strain of the tape-shaped optical fibers is accurately controlled so that a small amount of elongation strain, for instance about 0.02%, remains in the tape-shaped optical fibers. Therefore, the provision of the optical fiber unit according to the invention can solve the following problems: (1) if elongation strain remains in the optical fibers of an optical cable, the optical fibers are fatigued and deteriorated; that is, they are lowered in mechanical strength, (2) if the elongation strain is large, the optical fibers may be broken when used for a long period of time, and (3) if the compression strain remains in the optical fibers, the transmission characteristic may be lowered. Accordingly, an optical cable using the optical fiber unit of the invention is highly reliable and maintains a stable transmission characteristic for a long period of time.

What is claimed is:

1. An optical fiber unit comprising:
a core body having a twisted tensile strength member extended along the central axis thereof and spiral grooves formed in an outer surface thereof and spiral ribs formed between said spiral grooves; and
tape-shaped optical fibers inserted in said spiral grooves,
wherein the twisted tensile strength member and said spiral ribs being disposed with respect to one another so that an angular moment in the tensile strength member and an angular moment in the ribs the are opposite in direction and substantially equal in magnitude.

2. An optical fiber unit as claimed in claim 1, wherein said twisted tensile strength member comprises a plurality of twisted elements twisted in said twist direction with a twist pitch $p_c$ to form an angle $\theta$ with respect to said central axis and said spiral ribs being wound around said core body in said spiral winding direction with a spiral pitch $p_R$ to form an angle $\phi$ with respect to said central axis, and wherein said twist pitch $p_c$ and said spiral pitch $p_R$ satisfy the following equations:

$$\frac{p_R}{p_c} = \frac{a_R}{a_c} \frac{\tan\theta}{\tan\phi},$$

$$\frac{\sin\theta}{\sin\phi} = \frac{n_R^2 a_R E_R S_R}{n^2 a_c E_c S_c}$$

where $E_c$ is the Young's modulus of said twisted tensile strength member in a longitudinal direction of said core body, $S_c$ is the sectional area of each twisted element forming said tensile strength member, $a_c$ and $p_c$ are the twist radius and said twist pitch of said tensile strength member, respectively, $n_c$ is the number of twisted elements forming said tensile strength member, $E_R$ is the Young's modulus of each rib, $a_R$ is the distance between the central axis of said core body and the center of each said spiral rib, $S_r$ is the sectional area of each rib and $p_R$ and $n_R$ are the spiral pitch of said spiral ribs and the number of ribs, respectively.

* * * * *